(12) United States Patent
Malz et al.

(10) Patent No.: US 7,625,849 B2
(45) Date of Patent: Dec. 1, 2009

(54) MIXTURES COMPRISING PHENOLIC STABILISERS AND A REDUCING AGENT

(75) Inventors: Hauke Malz, Diepholz (DE); Thomas Flug, Wagenfeld (DE); Sylvia Rybicki, Ostercappeln (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 606 days.

(21) Appl. No.: 10/531,186

(22) PCT Filed: Oct. 28, 2003

(86) PCT No.: PCT/EP03/11932

§ 371 (c)(1), (2), (4) Date: Apr. 11, 2005

(87) PCT Pub. No.: WO2004/039878

PCT Pub. Date: May 13, 2004

(65) Prior Publication Data

US 2006/0122076 A1    Jun. 8, 2006

(30) Foreign Application Priority Data

Oct. 30, 2002   (DE)   ................ 102 50 768

(51) Int. Cl.
  *C10M 129/70*   (2006.01)
  *C11B 5/00*   (2006.01)
  *C07C 69/76*   (2006.01)

(52) U.S. Cl. ............................. 508/478; 554/7; 560/103

(58) Field of Classification Search ................ 508/478; 554/7; 560/103
  See application file for complete search history.

(56) References Cited

U.S. PATENT DOCUMENTS

| 3,285,855 | A | * | 11/1966 | Dexter et al. | 508/476 |
| 3,305,520 | A | * | 2/1967 | Fritz et al. | 524/151 |
| 3,330,859 | A | * | 7/1967 | Dexter et al. | 560/75 |
| 3,535,249 | A | * | 10/1970 | Larson | 524/270 |
| 3,554,964 | A | | 1/1971 | Miller | |
| 3,644,482 | A | * | 2/1972 | Dexter et al | 560/75 |
| 4,316,996 | A | * | 2/1982 | Collonge et al. | 568/784 |
| 4,960,808 | A | * | 10/1990 | Schmitter | 524/151 |
| 5,234,702 | A | * | 8/1993 | Katz et al. | 426/72 |

FOREIGN PATENT DOCUMENTS

| CH | 613 466 | 9/1979 |
| DE | 198 06 846 | 8/1998 |
| EP | 0 289 077 | 11/1988 |
| FR | 1 452 520 | 2/1966 |
| GB | 893 396 | 4/1962 |

OTHER PUBLICATIONS

Zweifel, Hans: Plastics Additives Handbook, 5$^{th}$ Edition, Hanser Publishers, vol. 1, pp. 98-107, 2001.
Zweifel, Hans: Plastics Additives Handbook, 5th Edition, Hanser Publishers, vol. 1, pp. 116-121, 2001.

* cited by examiner

*Primary Examiner*—Glenn Caldarola
*Assistant Examiner*—Jim Goloboy
(74) *Attorney, Agent, or Firm*—Oblon, Spivak, McClelland, Maier & Neustadt, L.L.P.

(57) ABSTRACT

Mixtures comprising amorphous phenolic stabilisers and at least one reducing agent.

20 Claims, No Drawings

MIXTURES COMPRISING PHENOLIC STABILISERS AND A REDUCING AGENT

The invention relates to mixtures comprising amorphous phenolic stabilizers and at least one reducing agent, preferably at least one organophosphorus compound of trivalent phosphorus, particularly preferably phosphite and/or phosphonite, and also to a process for preparing an ester and/or amide, in particular for preparing a stabilizer, for example by condensation, e.g. esterification, transesterification, transamidation, and/or amidation, preferably of at least one phenolic carboxylic acid and/or derivative thereof, using at least one alcohol and/or amine. The invention also relates to plastics or lubricating oils comprising the mixtures of the invention.

Plastics, such as polyurethanes, polyolefins, polyacetals, styrene polymers, styrene copolymers, polyamides, and polycarbonates, are stabilized with heat stabilizers in order to minimize deterioration of mechanical properties and discoloration of the products due to oxidative degradation. Examples of familiar antioxidants used in industry are phenolic stabilizers, these being supplied with various trade marks. These phenolic stabilizers are also widely described in the literature. Examples of commercial phenolic stabilizers are found in Plastics Additives Handbook, 5th edition, H. Zweifel, ed., Hanser Publishers, Munich, 2001 ([1]), pp. 98-107 and pp. 116-121.

Many of the abovementioned plastics are used in transparent, translucent, or colored applications, where the intrinsic color of the plastic plays a decisive part. For example, the customer may reject the product merely on the grounds of excessive yellowness of the plastic.

Due to their structure, phenolic stabilizers can undergo various chemical reactions which convert them into products having chromophoric character. In this context, chromophoric means that the substances absorb light in the visible region and therefore contribute to the intrinsic color of the stabilizer. If discoloration of the plastic is to be avoided, it is necessary to eliminte any additives which have chromophoric properties. Phenolic stabilizers comprise substances with chromophoric character and are also avoided for this reason.

In phenolic stabilizers, these chromophores can arise even before synthesis of the stabilizer is complete. In particular if no purification of the stabilizer, e.g. distillation or recrystallization, follows the synthesis, or if the structure of the stabilizer prevents its purification, these chromophores formed during the synthesis can markedly reduce quality and thus the usefulness of the stabilizer.

It is an object of the present invention, therefore, to develop stabilizers which have minimum intrinsic color, i.e. in which the portion of chromobphoric contaminants in the stabilizer is reduced to a minimum.

We have found that this object is achieved by way of the stabilizers described at the outset.

Another object of the present invention consists in developing a process for preparing the phenolic stabilizers of the invention, in particular a process for preparing an ester and/or amide, for example by condensation, e.g. esterification, transesterification, transamidation, and/or amidation, preferably of at least one phenolic carboxylic acid and/or derivatives thereof, using at least one alcohol and/or amine, leading to phenolic esters and/or phenolic amides, in particular to the phenolic stabilizer mixtures of the invention which has minimum intrinsic color, i.e. in which the proportion of chromophoric contaminants in the product mixture, in particular in the stabilizer mixture, is minimized. The method of synthesis should permit consistent product quality, defined via the color value.

We have found that this object is achieved by carrying out the esterification, transesterification, transamidation, and/or amidation in the presence of at least one reducing agent, preferably of at least one organophosphorus compound of trivalent phosphorus, particularly preferably phosphite and/or phosphonite. Due to the addition of the reducing agent to the reaction mixture used to prepare the phenolic stabilizer, it was possible to achieve a marked reduction in the intrinsic color of the reaction product when comparison is made with phenolic stabilizers prepared in the absence of reducing agents. Not only does use of the particularly preferred phosphorus compounds as reducing agents reduce color here: the particularly preferred phosphorus compounds may themselves serve as stabilizers and appropriately remain in the product mixture of the invention comprising the phenolic stabilizers and the reducing agents. The advantage of the lower level of intrinsic color in the mixtures of the invention is particularly relevant in the case of amorphous stabilizers for which conventional purification steps, e.g. crystallization, cannot be used for removing chromophores, because these stabilizers of the invention do not crystallize. Nor can the phenolic stabilizers generally be subjected to other purification processes which are usual in other circumstances, e.g. distillation, since the molar masses are very high and therefore the vapor pressures of these compounds are very low, and the tendency to form the chromophores is increased specifically at the high temperatures needed.

The preparation process of the invention is based on reaction of a phenolic active ingredient group (IA), preferably of a phenolic carboxylic acid and/or derivative thereof, using an anchor group (IB), i.e. using a compound which has at least one hydroxy group and/or at least one amino group. According to the invention, active ingredient group (IA) and anchor group (IB) are bonded by way of an amide group and/or by way of an ester group. To form this ester group and/or amide group, use may be made of the appropriate acid directly, or else of suitable acid derivatives, e.g. acid halides, anhydrides, and other esters and/or amides of the acid, in particular those with a volatile alcohol or amine. The acid or acid derivatives are reacted in the presence of the reducing agent under conditions which are usual in other respects, preferably at a pressure of 1000 to 10 mbar, usually at an elevated temperature, preferably from 70 to 300° C., with preference from 110 to 200° C., using alcohols and/or amines of anchor group (IB) to give the desired esters and/or amides.

For example, the methyl ester of an active ingredient group (IA), e.g. the methyl ester of the preferred or particularly preferred phenolic carboxylic acids, in particular methyl 3-(3,5-di-tert-butyl-4-hydroxyphenyl)propionate, may be reacted using an anchor group (IB), e.g. using an alkyl alcohol having an OH group and from 7-9 carbon atoms, and/or using a polyethylene glycol with a number-average molar mass of 200 g/mol.

Where appropriate, this reaction may be carried out in the presence of conventional catalysts. To accelerate the reaction, use may be made of well-known catalysts, e.g. sulfonic acids, such as toluenesulfonic acid, or basic catalysts, such as lithium hydroxide, lithium methoxide, lithium ethoxide, potassium hydroxide, potassium methoxide, potassium ethoxide, potassium tert-butoxide, sodium hydroxide, sodium methoxide, sodium ethoxide and/or sodium tert-butoxide, but preferably potassium methoxide and/or potassium tert-butoxide. Preference is given to basic catalysts. It has been found to be advantageous not to add the catalyst all at once to the reaction mixture but to feed it gradually, because this method can reduce reaction time. Surprisingly, it has been found that use of the abovementioned catalysts gives a markedly greater reduction in color in the product than conventional metallic transesterification catalysts, e.g. tin compounds, such as dibutyltin dilaurate and/or dimethyltin dilaurate, or titanium compounds, such as titanium tetrabutylate. It is therefore preferable not to use metallic catalysts.

If a basic catalyst is used for the transesterification process, an example of a typical procedure consists in first charging the anchor group (IB), e.g. a polyetherol with a number-average molar mass of 200 g/mol to a reactor. The active ingredient group (IA), e.g. methyl 3-(3,5-di-tert-butyl-4-hydroxyphenyl)propionate, is then preferably added to the reactor, and the mixture is heated, for example to 100° C. After the preferred inertization, the reducing agent, preferably phosphite, is metered in, together with the basic catalyst, e.g. potassium methoxide, the usual concentration of which used is from 500 to 5000 ppm, particularly preferably from 1000 to 2000 ppm, based on the total amount of mixture. The reaction temperature is then raised, preferably to 120-200° C., particularly preferably 130-170° C., in particular 140-150° C., and the resultant methanol is distilled off. Where appropriate, further potassium methoxide may be fed subsequently to increase conversion during the reaction.

Once the reaction has ended, the potassium catalyst may then be separated off from the stabilizer of the invention by well-known methods for separating potassium catalysts from polyetherols, e.g. by using ion exchangers, or by using phosphoric acid or hydrochloric acid, but preferably phosphoric acid.

In an example of a method for this purpose, 85% of the stoichiometric amount of phosphoric acid, where the term stoichiometric is based on the amount of potassium methoxide used can therefore vary, is fed to the reaction mixture and stirred for 30 min. After filtration of the phosphate, the stabilizer can be used without further complicated purification processes, because it has little intrinsic color. In some circumstances it can be desirable to remove the reducing agent which was added. An example of a method for this is distillation if the selection of the reducing agent is such that its molar mass is markedly lower than that of the phenolic stabilizer.

The active ingredient group (IA) used may be well-known carboxylic acids and/or derivatives thereof, e.g. acid halides such as acid chlorides, anhydrides, esters, and/or amides which have a phenolic group. Preference is given to the use of the following phenolic carboxylic acids or derivatives thereof, e.g. acid halide, preferably acid chloride, anhydride, amide, and/or ester:

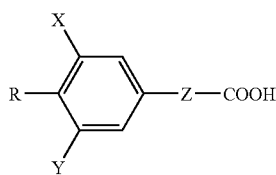

where
R is —OH,
X and Y, independently of one another, are hydrogen, or a straight-chain, branched-chain, and/or cyclic alkyl group having from 1 to 12 carbon atoms, preferably —C(CH$_3$)$_3$
Z is a linear or branched alkylene radical having from 1 to 12 carbon atoms, preferably —CH$_2$—CH$_2$—.

It is therefore preferable for the active ingredient group (IA) used to be the following carboxylic acid or an appropriate derivative thereof described above:

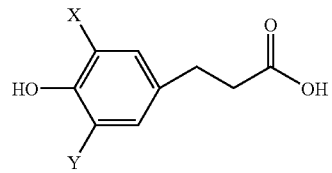

where
X and Y, independently of one another, are hydrogen, or a straight-chain, branched-chain, and/or cyclic alkyl group having from 1 to 12 carbon atoms, preferably —C(CH$_3$)$_3$.

The active ingredient group (IA) used is particularly preferably the following carboxylic acid or an appropriate derivative thereof described above:

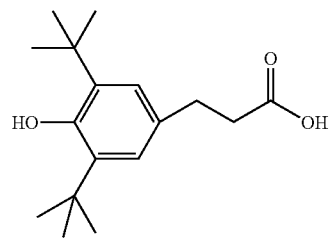

The synthesis of the phenolic active ingredient groups (IA) is well-known. Specifications by way of example for the synthesis of methyl 3-(3,5-di-tert-butyl-4-hydroxyphenyl) propionate are found in U.S. Pat. No. 3,644,482, page 4, line 28 et seq. An example of a process is described below: to prepare methyl 3-(3,5-di-tert-butyl-4-hydroxyphenyl)propionate, use may be made, for example, of 2,6-di-tert-butylphenol and from 0.1 to 10 mol %, based on 2,6-di-tert-butylphenol, of a basic catalyst, such as lithium hydroxide, lithium methoxide, lithium ethoxide, potassium hydroxide, potassium methoxide, potassium ethoxide, potassium tert-butoxide, sodium hydroxide, sodium methoxide, sodium ethoxide, and/or sodium tert-butoxide, but preferably potassium methoxide or potassium tert-butoxide, may be charged to a reactor. After removal of the corresponding alcohol by distillation, through heating to 120-200° C., for example, but preferably 130-160° C. with nitrogen flushing and/or vacuum, e.g. methanol if potassium methoxide is used, or water if potassium hydroxide is used, the reactive mixture may then be temperature-controlled to 90-160° C., preferably 100-130° C., and methyl acrylate may be slowly metered in, preferably under a pressure which is greater than the vapor pressure of methyl acrylate at the given reaction temperature. This ensures that no methyl acrylate is removed from the reaction solution. If the operation is carried out at atmospheric pressure, evaporated methyl acrylate is preferably passed back via reflux into the reaction solution. The amount of methyl acrylate metered in to the 2,6-di-tert-butylphenol is preferably from 90 to 120 mol %, based on 2,6-di-tert-butylphenol, but in particular from 95 to 110 mol %. After a reaction time of from 60 to 180 min, the reaction is usually terminated. The reaction product may then be purified a well-known manner by neutralization of the alkaline catalyst followed by recrystallization or rectification. If the intention is to use a basic catalyst during the subsequent preparation of the phenolic stabilizer of the invention, methyl acrylate may preferably be removed from the reaction product, for example preferably at from 50 to 80° C., in particular 60° C., preferably in vacuo and/or with nitrogen flushing, the anchor group (IB) then being added to the mixture comprising the phenolic active ingredient group (IA). AFter intertization and metering-in of the reducing agent, the transesterification reaction may then be continued as described above. The advantage of this procedure, which can be carried out in a reactor, is the efficient utilization of the reactor and the omission of the purification step.

If the stabilizer is prepared from a sterically hindered phenol by chemical reaction, e.g. transesterification or transamidation using an alcohol or amine, sterically hindered phenol may be prepared in situ. As an alternative, it may be prepared in a first stage of a reaction, isolated, and then reacted using the alcohol or amine. However, in both cases, even before the preparation of the sterically hindered phenol is complete there can be production of contaminants which lead to chromophores during the subsequent reaction of the sterically hindered phenol to give the final stabilizer. The concentration of these chromophores can vary within a wide range during this process. The result of this is that the individual batches of stabilizer have different color values, making it impossible to supply consistent quality. The inventive use of the reducing agent can achieve consistent product color even when chromophore concentration varies.

The anchor group (IB) serves, inter alia, to adjust the molar mass of the stabilizer, both by way of the molar mass of the anchor group itself and also by way of the number of hydroxy and/or amino groups to which active ingredient groups (IA) can become bonded. The anchor group (IB) preferably has from 1 to 20 hydroxy groups and/or from 0 to 20 amino groups. The anchor group (IB) particularly preferably has from 1 to 6, in particular from 1 to 4, hydroxy groups. The anchor group is a compound whose hydroxy and/or amino group can bond to the carboxy function of the phenolic active ingredient group (IA) by way of an ester group or by way of an amide group. The hydroxy group(s) of the anchor group (IB) is/are preferably (a) primary hydroxy group(s), to the extent that hydroxy groups, and not only amino groups, are resent. Examples of anchor groups which may be used are linear, ranched, or cyclic alkyl groups having from 1 to 30 carbon atoms and from 1 to 20 OH groups, preferably from 1 to 6 OH groups, in particular from 1 to 4 OH groups, examples of corresponding compounds being methanol, heptanol, octanol, nonanol, dodecanol, 3-methylbutanol, 3-ethylhexanol, ethanediol, hexanediol, octanediol, dodecanediol, neopentyl glycol, hexamethylenediamine, and pentaerithritol. Other anchor groups which may be used correspond to ethers, e.g. diethylene glycol, triethylene glycol, dipropylene glycol, tripropylene glycol, polyalkylene glycol, and/or polytetrahydrofuran with a number-average molar mass of from 120 to 3000 g/mol, e.g. a polyethylene glycol with a number-average molar mass of 200 g/mol, or a polytetrahydrofuran with a number-average molar mass of 250 g/mol. It is also possible to use mixtures of different anchor groups (IB).

Use may also be made of other anchor groups well-known for reaction with phenolic active groups to prepare phenolic stabilizers. A preferred anchor group (IB), i.e. alcohol, used corresponds to at least one polyether alcohol, particularly preferably polyalkylene ether diol, in particular polyethylene glycol and/or polytetrahydrofuran, preferably with a molar mass of from 120 to 3000 g/mol, particularly preferably from 120 to 600 g/mol. Preference is also given to the use of monofunctional linear or branched alkyl alcohols having from 7 to 18 carbon atoms, in particular to a mixture composed of monofunctional alkyl alcohols having from 7 to 9 carbon atoms, the mixture having an average of 8 carbon atoms per alkyl alcohol. Preference is also given to use of linear alkyl alcohol having 18 carbon atoms. The use of monofunctional linear or branched alkyl alcohols having from 13 to 15 carbon atoms is also preferred.

Reducing agents used may be well-known reducing agents, preferably phosphorus compounds and/or sodium dithionite, particularly preferably organophosphorus compounds of trivalent phosphorus, in particular phosphite and phosphonite. Examples of suitable phosphorus compounds are triphenyl phosphite, diphenyl alkyl phosphite, phenyl dialkyl phosphite, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, di(2,4-di-tert-butylphenyl) pentaerythritol diphosphite, tristearylsorbitol triphosphite, tetrakis(2,4-di-tert-butylphenyl) 4,4'-diphenylenediphosphonite, 4,4'-isopropylidenediphenol alkyl (C12-15) phosphite (CAS No: 96152-48-6), poly (dipropylene glycol) phenyl phosphite, tetraphenyl dipropylene glycol phosphite, tetraphenyl diisopropylene glycol phosphite, trisisodecyl phosphite, diisodecyl-phenyl phosphite, diphenyl isodecyl phosphite, and mixtures of these.

Other examples of phosphorus compounds are found in Plastics Additives Handbook, 5th edition, H. Zweifel, ed., Hanser Publishers, Munich, 2001 ([1]), pp. 109-112. Preference is given to the use of tris(nonylphenyl) phosphite, 4,4'-isopropylidenediphenol alkyl (C12-15) phosphite (CAS No: 96152-48-6), poly(dipropylene glycol) phenyl phosphite, and/or tetraphenyl dipropylene glycol phosphite. Particular preference is given to the use of poly(dipropylene glycol) phenyl phosphite, 4,4'-isopropylidenediphenol alkyl (C12-15) phosphite (Weston 439®) (CAS No: 96152-48-6), tetraphenyl dipropylene glycol phosphite, triisooctyl phosphite, tris(4-n-nonylphenyl) phosphite, in particular poly(dipropylene glycol) phenyl phosphite and/or 4,4'-isopropylidenediphenol alkyl (C12-15) phosphite (CAS No: 96152-48-6). It is also possible to use mixtures of phosphites.

The content of reducing agent in the reaction mixture for preparing the phenolic stabilizer is preferably from 0.01 to 10% by weight, based on the total weight of the mixture, particularly preferably from 0.1 to 5% by weight, in particular from 0.1 to 1% by weight.

The phenolic esters and/or amides prepared by this process of the invention are present in the product of the process in the form of a mixture with the reducing agent(s). This mixture in particular has the advantage of particularly pale color. The reducing agent present in the-mixture, in particular the phosphites have no adverse effect in applications for the stabilization of organic compounds, such as plastics or lubricating oils, because the phosphites, too, have a stabilizing action.

The mixtures of the invention, which can therefore be used directly as a stabilizer mixture, preferably have an iodine color number of <5, particularly preferably from 0 to 5, in particular from 0 to 3, with particular preference from 0 to 1, in each case measured to DIN 6162. If the iodine number is <1, it is advisable to use the Hazen (DIN 53409) definition of color. The particularly preferred stabilizers accordingly have a Hazen number <100, preferably from 0 to 100, particularly preferably a Hazen number of <70, in particular a Hazen number of from 0 to 70, with particular preference $\leqq 50$. Commonly used processes cannot achieve this low level of color, which is attributable to the use of the reducing agent in the mixture.

The mixture of the invention, and also the preferred embodiments of the mixtures, result from use of the preferred starting materials described at the outset above.

Preference is therefore given to mixtures in which the phenolic stabilizer has the following structural unit:

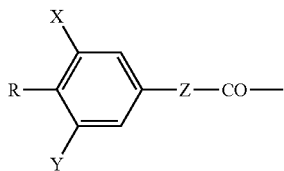

where
R is —OH,
X and Y, independently of one another, are hydrogen, or a straight-chain, branched-chain, and/or cyclic alkyl group having from 1 to 12, preferably from 3 to 5, carbon atoms, particularly preferably —C(CH$_3$)$_3$
Z is an alkylene radical having from 1 to 12 carbon atoms, preferably —CH$_2$—CH$_2$—.

Preference is also given to mixtures in which the phenolic stabilizer has at least one phenolic active ingredient group (IA) and has at least one anchor group (IB), where (IA) and (IB) have bonding by way of an ester group and/or by way of an amide group, and, as (IB), at least one polyether with a molar mass of from 120 to 3000 g/mol is present, preferably polyethylene glycol and/or polytetrahydrofuran.

Particular preference is given to mixtures comprising the following phenolic stabilizer:

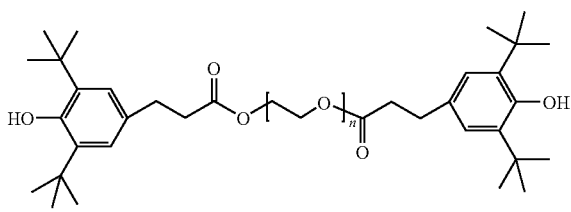

where n is 1, 2, 3, 4, 5, 6, 7, 8, 9, or 10, preferably 2, 3, 4, 5, or 6, particularly preferably 3 or 4. The selection of n is in particular such that the number-average molar mass of the stabilizer is from 700 to 800 g/mol. The selection of n is particularly preferably such that in the combined system, i.e. in the stabilizer mixture comprising the individual stabilizer molecules, the weight-average molar mass of the stabilizer mixture is greater than the number-average molar mass of the stabilizer mixture.

Particular preference is therefore given to mixtures comprising the following phenolic stabilizer:

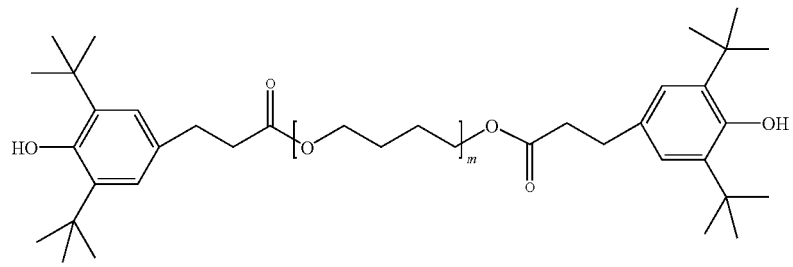

where m is 1, 2, 3, 4, 5, 6, 7, 8, 9, or 10, preferably 2, 3, 4, 5, or 6, particularly preferably 3 or 4. The selection of m is in particular such that the number-average molar mass of the stabilizer is from 700 to 900 g/mol. The selection of m is particularly preferably such that in the combined system, i.e. in the stabilizer mixture comprising the individual stabilizer molecules, the weight-average molar mass of the stabilizer mixture is greater than the number-average molar mass of the stabilizer mixture.

Particular preference is also given to mixtures comprising the following phenolic stabilizer:

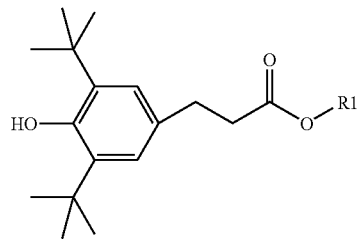

where R1 is an octadecyl radical or a linear or branched alkyl radical having from 7 to 15, preferably from 13 to 15 or 7 to 9, carbon atoms.

In the mixture of the invention, the ratio of phenolic stabilizer to reducing agent by weight is preferably from 10 000:1 to 10:1, particularly preferably from 1000:1 to 20:1, in particular from 1000:1 to 100:1.

The phenolic esters and/or amides of the invention in a mixture with the reducing agents, in particular with the phosphites, are useful as stabilizers for organic materials which are usually subject to oxidative decomposition. Examples of these materials are: synthetic organic polymeric compounds, such as vinyl resins formed during the polymerization of vinyl halides with unsaturated polymerizable compounds, e.g. with vinyl esters, with α,β-unsaturated aldehydes, or with unsaturated hydrocarbons, such as butadiene or styrene; poly-α-olefins, such as polyethylene, polypropylene, polyoxymethylene, polybutylene, polyisoprene, and the like, including the copolymers of poly-α-olefins; polyurethanes, such as those prepared from polyols and from organic polyisocyanates; polyamides, such as polyhexamethyleneadipinamide and polycaprolactam; polyesters, such as polymethylene terephtalates; polycarbonates; polyacetals; polystyrene; polyethylene oxide and copolymers, such as those known from high-impact-resistance polystyrene, which comprises copolymers of butadiene and styrene, and copolymers formed by copolymerization of acetonitrile, butadiene, and/or styrene. Examples of the materials which may be stabilized using the compounds of the invention are: lubricating oils of the aliphatic ester type, such as di(2-ethylhexyl) azelate, pentaerythritol tetracaproate, and the like; animal and vegetable oils, such as linseed oil, fat, tallow, lard, groundnut oil, cod liver oil, castor oil, palm oil, maize oil, cottonseed oil, and the like; hydrocarbon materials, such as gasoline, mineral oil, fuel oil, dry oils, cutting fluids, waxes, resins, and rubber; fatty acids, soaps, and the like.

Preference is given to the use of the stabilizers of the invention in any of the known thermoplastics, such as, acrylonitrile-butadiene-styrene copolymers (ABS), ASA, SAN, polyethylene, polypropylene, EPM, EPDM, PVC, acrylate rubber, polyester, polyoxymethylene (POM), polyamide (PA), PC (polycarbonate) and/or in thermoplastic polyurethanes, also termed TPUs in this specification, for stabilization, for example with respect to UV radiation. Preference is given to the use of the stabilizers within thermoplastic polyurethanes.

The thermoplastics, in particular the TPUs, preferably comprise from 0.01 to 5% by weight, particularly preferably from 0.1 to 2% by weight, in particular from 0.3 to 1.5% by weight, of the phenolic stabilizers, in each case based on the weight of the thermoplastic. In addition to the stabilizers of the invention, other well-known stabilizers may be used in the thermoplastics, examples being other phosphites, and also thiosynergists, HALS compounds, UV absorbers, quenchers.

The stabilizers of the invention, and in particular mixtures comprising the phenolic esters and/or amides, may be added to the compounds (b) reactive toward isocyanates either prior to or during the preparation of the TPUs, or else may be added to the finished TPU, for example to the molten or softened TPU. The thermoplastic polyurethane may undergo thermoplastic processing without loss of the action of the stabilizers of the invention. Processes for preparing TPUs are well known. For example, the thermoplastic polyurethanes may be prepared by reacting (a) isocyanates with (b) compounds reactive toward isocyanates and having a molar mass of from 500 to 10000, and, where appropriate, with (c) chain extenders having a molar mass of from 50 to 499, where appropriate in the presence of (d) catalysts, and/or of (e) conventional auxiliaries and/or additives, the reaction being carried out in the presence of the inhibitors of the invention. The starting components and processes for preparing the preferred TPUs will be illustrated below by way of example. Examples of the components (a), (b), and also, where appropriate (c), (e) and/or (f) usually used in preparing the TPUs will be described in-the following:

a) Organic isocyanates (a) which may be used are well-known aliphatic, cycloaliphatic, araliphatic, and/or aromatic isocyanates, for example tri-, tetra-, penta-, hexa-, hepta-, and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate and/or dicyclohexylmethane 4,4'-, 2,4'-, and 2,2'-diisocyanate, diphenylmethane 2,2'-, 2,4'-, and/or 4,4'-diisocyanate (MDI), 1,5-naphthylene diisocyanate (NDI), tolylene 2,4- and/or 2,6-diisocyanate (TDI), diphenylmethane diisocyanate, 3,3'-dimethyldiphenyl diisocyanate, 1,2-diphenylethane diisocyanate and/or phenylene diisocyanate.

b) Compounds (b) which are reactive toward isocyanates and which may be used are the well-known compounds reactive toward isocyanates, for example polyesterols, polyetherols, and/or polycarbonatediols, these usually being brought together under the term "polyols", with molar masses of from 500 to 8000, preferably from 600 to 6000, in particular from 800 to 4000, and preferably with an average functionality of from 1.8 to 2.3, preferably from 1.9 to 2.2, in particular 2. It is preferable to use polyether polyols, particularly preferably those polyetherols based on polyoxytetramethylene glycol. The polyetherols have the advantage that they are superior to polyesterols in resistance to hydrolysis.

c) Chain extenders (c) which may be used are well-known aliphatic, araliphatic, aromatic and/or cycloaliphatic compounds with a molar mass of from 50 to 499, preferably bifunctional compounds, for example diamines and/or alkanediols having from 2 to 10 carbon atoms in the alkylene radical, in particular 1,4-butanediol, 1,6-hexanediol, and/or di-, tri-, tetra-, penta-, hexa-, hepta-, octa-, nona-, and/or decaalkylene glycols having from 3 to 8 carbon atoms, and preferably corresponding oligo- and/or polypropylene glycols. Mixtures of the chain extenders may also be used here.

d) Suitable catalysts which in particular accelerate the reaction between the NCO groups of the diisocyanates (a) and the hydroxy groups of the structural components (b) and (c) are the known and conventional tertiary amines of the prior art, e.g. triethylamine, trimethylcyclohexylamine, N-methylmorpholine, N,N'-dimethylpiperazine, 2-(dimethylaminoethoxy)ethanol, diazabicyclo[2.2.2]octane, and the like, and also in particular organometallic compounds, such as titanic esters, iron compounds, e.g. ferric acetylacetonate, tin compounds, e.g. stannous diacetate, stannous dioctoate, stannous dilaurate, or the dialkyltin salts of aliphatic carboxylic acids, e.g. dibutyltin diacetate, dibutyltin dilaurate, or the like. The amounts usually used of the catalysts are from 0.0001 to 0.1 part by weight per 100 parts by weight of polyhydroxy compound (b).

e) Besides catalysts (d), conventional auxiliaries (e) may also be added to the structural components (a) to (c). By way of example, mention may be made of surface-active substances, fillers, flame retardants, nucleating agents, antioxidants, lubricants, and mold-release agents, dyes, and pigments, and, where appropriate, stabilizers in addition to the stabilizers of the invention, e.g. with respect to hydrolysis, light, heat, or discoloration, inorganic and/or organic fillers, reinforcing agents, and plasticizers.

Further details concerning the abovementioned auxiliaries and additives can be found in the technical literature. All of the molar masses mentioned in this specification have the unit [g/mol]. To adjust hardness of the TPUs, the molar ratios of the structural components (b) and (c) may be varied relatively widely. Molar ratios which have proven successful between component (b) and the entire amount of chain extenders (c) to be used are from 10:1 to 1:10, in particular from 1:1 to 1:4, the hardness of the TPUs rising as content of (c) increases. The reaction may take place at conventional indices, preferably at an index of from 60 to 120, particularly preferably at an index of from 80 to 110. The index is defined via the ratio of the total number of isocyanate groups used during the reaction in component (a) to the groups reactive toward isocyanates, i.e. the active hydrogen atoms, in components (b) and (c). If the index is 100, there is one active hydrogen atom, i.e. one function reactive toward isocyanates, in compounds (b) and (c) for each isocyanate group in component (a). If the index is above 100, there are more isocyanate groups present than OH groups. The TPUs may be prepared by the known processes continuously, for example using reactive extruders or the belt process by the one-shot method or prepolymer method, or batchwise by the known prepolymer process. In these processes, components (a), (b), and, where appropriate, (c), (d), and/or (e) are mixed with one another in succession or simultaneously, whereupon the reaction begins immediately. In the extruder process, structural components (a), (b), and also, where appropriate, (c), (d), and/or (e) are introduced, individually or as a mixture, into the extruder, and reacted, e.g. at temperatures of from 100 to 280° C., preferably from 140 to 250° C., and the resultant TPU is extruded, cooled, and pelletized. Conventional processes, e.g. injection molding or extrusion, are used to process the TPUs of the invention, comprising the stabilizers of the invention, these usually being in the form of pellets or powder, to give the desired films, moldings, rollers, fibers, coverings within automobiles, tubing, cable plugs, folding bellows, drag cables, cable sheathing, gaskets, drive belts, or attenuating elements. The thermoplastic polyurethanes which can be prepared by the process of the invention, preferably the films, moldings, shoe soles, rollers, fibers, coverings within automobiles, wiper lades, tubing, cable plugs, folding bellow, drag cables, cable sheathing, gaskets, drive belts, or attentuating elements, have the advantages described at the outset, i.e. less color, due to the use of a stabilizer with a particularly pale color.

The examples below are intended to illustrate the advantages of the invention.

EXAMPLES 1 TO 22

25 g of a polyethylene glycol with an OH value of 557 mg KOH/g were weighed into a four-necked flask and heated to 145° C. with 71.13 g of methyl 3-(3,5-di-tert-butyl-4-hydroxyphenyl)propionate (Examples 1 to 10: Bejing Factory No. 3, batch No. 2001-10-16; Examples 11 to 14: Bejing Factory No. 3, batch No. 2001-10-18; Examples 15 to 22: Raschig) and the amounts of reducing agent stated in Table 1. During the heating phase and the transesterification reaction, a stream of nitrogen was passed continuously through the solution. Once the temperature of 145° C. had been reached, 0.177 g=2000 ppm of potassium methoxide was added to the solution in order to initiate the main transesterification reaction. The resultant methanol was isolated by freezing in a downstream cold trap (liquid nitrogen). After six hours of reaction time, the product was cooled to 80° C. 0.246 g of 85% strength phosphoric acid was then added to the flask to neutralize the product. The product was then stirred for a further half hour at 80° C. and then filtered through a SeitzSchenk pressure filter using a type T750 filter (retention rating from 4-10 μm). The conversion in the transesterification reaction, determined by way of gel permeation chromatography, was above 95% in all examples. Potassium content was determined by atomic absorption spectroscopy, and for all experiments was below 20 ppm.

TABLE 1

Comparison of iodine color number of reaction products

| Example | Reducing agent | Iodine color number |
|---|---|---|
| 1 | None | 6 |
| 2 | 1% by weight of TNPP | 3 |
| 3 | 1% by weight of TLP | 4 |
| 4 | 1% by weight of TIOP | 3 |
| 5 | 0.5% by weight of sodium hypophosphite | 4 |
| 6 | 0.5% by weight of sodium dithionite | 4 |
| 7 | 1% by weight of DHOP | 2 |
| 8 | 1% by weight of Weston ® 439 | Hazen number 125 |
| 9 | 1% by weight of TDP | 5 |
| 10 | 1% by weight of THOP | Hazen number 125 |
| 11 | None | 23 |
| 12 | 0.1% by weight of TNPP | 12 |
| 13 | 0.5% by weight of TNPP | 4 |
| 14 | 1% by weight of TNPP | 3 |
| 15 | None | 12 |
| 16 | 0.1% by weight of TNPP | 6 |
| 17 | 0.5% by weight of TNPP | 4 |
| | | Hazen number |
| 18 | 1% by weight of TNPP | 70 |
| 19 | 1% by weight of DHOP | 50 |
| 20 | 1% by weight of Weston ® 439 | 90 |
| 21 | 1% by weight of TDP | 100 |
| 22 | 1% by weight of THOP | 80 |

TIOP = triisooctyl phosphite
TLP = trilauryl phosphite
TNPP = tris(4-n-nonylphenyl) phosphite
DHOP = poly(dipropylene glycol) phenyl phosphite
TDP = triisodecyl phosphite
THOP = tetraphenyl diisopropylene glycol phosphite
Weston ® 439 is a commercially available product from General Electric Speciality Chemicals

EXAMPLES 23 TO 25

2.7 mol (557.1 g) of 2,6-di-tert-butylphenol were weighed into a 2 L round four-necked flask together with 2 mol % (3.79 g) of potassium methoxide. This mixture was dried at 165° C. under $N_2$ flushing for 30 min. The resultant methanol was isolated by freezing in the cold trap. The apparatus was then fitted with a reflux condenser, and 2.97 mol (255.7 g) of methyl acrylate (=10% molar excess) were then added. During addition, care is taken that the temperature in the flask does not fall below 130° C. Stirring of the mixture was continued for 2 h at 140° C.

The reflux condenser was then replaced by a distillation bridge, and excess MA was then driven off with continuous introduction of nitogen for 30 min. 268.1 g of a polyethylene glycol with an OH value of 565 mg KOH/g, i.e. with an average molar mass of 198.58 g/mol, was then added to the reaction mixture, as were the reducing agents stated in table 2. The product was stirred for 7 h at 140° C. Introduction of nitrogen continued. After this time, the finished phenolic stabilizer was cooled to 80° C. 85% strength $H_3PO_4$ was added, the amount (5.3 g) being equivalent to the catalyst. After 30 min of stirring at 80° C., the precipitated salt was removed from the product by way of a heatable pressure filter from SeitzSchenk (filter: type T750) at 90° C.

TABLE 2

Comparison of iodine color number of reaction products

| Experiment | Reducing agent | Iodine color number |
|---|---|---|
| 23 | None | 9 |
| 24 | 11% by weight of TNPP | 6 |
| 25 | 3% by weight of TNPP | 3 |

We claim:
1. A mixture comprising an amorphous phenolic stabilizer mixture and at least one reducing agent,
   wherein the mixture has a color value with a Hazen number <100 to DIN 53409 and the amorphous phenolic stabilizer is represented by the following formula:

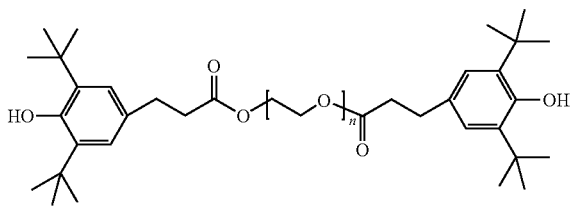

the selection of n is such that, in the stabilizer mixture comprising the individual stabilizer molecules, the weight-average molecular weight of the stabilizer mixture is greater than the number-average molecular weight of the stabilizer mixture.

2. A mixture comprising an amorphous phenolic stabilizer mixture and at least one reducing agent,
   wherein the mixture has a color value with a Hazen number <100 to DIN 53409 and comprises amorphous phenolic stabilizer represented by the following formula:

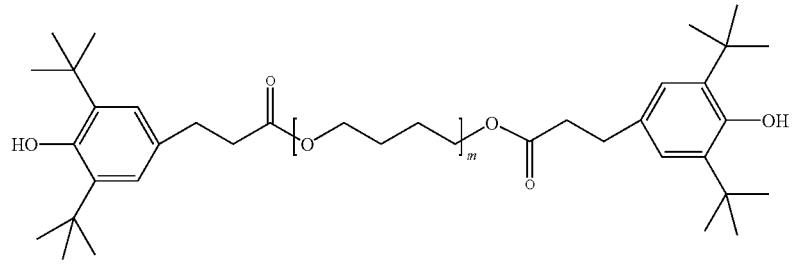

wherein the selection of m is such that, in the stabilizer mixture comprising the individual stabilizer molecules, the weight-average molecular weight of the stabilizer mixture is greater than the number-average molecular weight of the stabilizer mixture.

3. The mixture as claimed in claim 1, wherein the at least one reducing agent is at least one organophosphorus compound of trivalent phosphorus.

4. The mixture as claimed in claim 1, wherein a ratio of the amorphous phenolic stabilizer to the reducing agent by weight is from 10,000:1 to 10:1.

5. A material comprising the mixture as claimed in claim 1, wherein the material is one selected from the group consisting of a plastic, a lubricating oil, a vegetable oil and an animal oil.

6. A process for preparing an amorphous phenolic stabilizer according to claim 1, comprising carrying out one selected from the group consisting of esterification, transesterification, transamidation and amidation in the presence of at least one reducing agent.

7. The process as claimed in claim 6, comprising a phenolic carboxylic acid or a derivative of the carboxylic acid of the following formula:

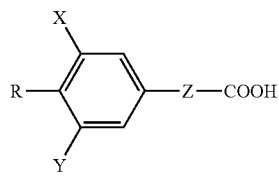

where
R is —OH,
X and Y, independently of one another, are selected from the group consisting of hydrogen, a straight-chain, branched-chain, and cyclic alkyl group having from 1 to 12 carbon atoms,
Z is an alkylene radical having from 1 to 12 carbon atoms.

8. The process as claimed in claim 6, comprising at least one polyethylene glycol with a molar mass of from 120 to 3000 g/mol.

9. The process as claimed in claim 6, wherein a content of the at least one reducing agent is from 0.01 to 10% by weight, based on a total weight of the mixture.

10. A mixture comprising the amorphous phenolic stabilizer obtained by the process as claimed in claim 6.

11. The mixture as claimed in claim 2, wherein the at least one reducing agent is at least one organophosphorous compound of trivalent phosphorous.

12. The mixture as claimed in claim 2, wherein a ratio of amorphous phenolic stabilizer to reducing agent by weight, is from 10,000:1 to 10:1.

13. A plastic or lubricating oil comprising a mixture as claimed in claim 2.

14. The process as claimed in claim 6, wherein a content of reducing agents in the reaction mixture for preparing the amorphous phenolic stabilizer is from 0.01 to 10% by weight, based on the total weight of the mixture.

15. A process for preparing an amorphous phenolic stabilizer according to claim 2, comprising carrying out one selected from the group consisting of esterification, transesterification, transamidation and amidation in the presence of at least one reducing agent.

16. The process as claimed in claim 15, comprising a phenolic carboxylic acid or a derivative of the carboxylic acid of the following formula:

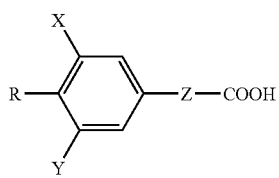

where

R is —OH,

X and Y, independently of one another, are selected from the group consisting of hydrogen, a straight-chain, branched-chain, and cyclic alkyl group having from 1 to 12 carbon atoms, Z is an alkylene radical having from 1 to 12 carbon atoms.

17. The process as claimed in claim 15, comprising at least one polytetrahydrofuran with a molar mass of from 120 to 3000 g/mol.

18. The process as claimed in claim 15, wherein a content of the at least one reducing agent is from 0.01 to 10% by weight, based on a total weight of the mixture.

19. A mixture comprising the amorphous phenolic stabilizer obtained by the process as claimed in claim 15.

20. The process as claimed in claim 15, wherein a content of reducing agents in the reaction mixture for preparing the amorphous phenolic stabilizer is from 0.01 to 10% by weight, based on the total weight of the mixture.

* * * * *